(12) United States Patent
Ye et al.

(10) Patent No.: US 9,569,022 B2
(45) Date of Patent: Feb. 14, 2017

(54) TOUCH PANEL AND TEST METHOD THEREOF

(71) Applicant: TPK TOUCH SOLUTIONS (XIAMEN) INC., Xiamen (CN)

(72) Inventors: Huilin Ye, Zhangzhou (CN); Shiyou Huang, Xiamen (CN); Zhuanyuan Zhang, Zhangzhou (CN); Tsung-Ke Chiu, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 103 days.

(21) Appl. No.: 14/340,500

(22) Filed: Jul. 24, 2014

(65) Prior Publication Data

US 2015/0028915 A1 Jan. 29, 2015

(30) Foreign Application Priority Data

Jul. 24, 2013 (CN) .......................... 2013 1 0313434

(51) Int. Cl.
*G06F 3/041* (2006.01)

(52) U.S. Cl.
CPC .............. *G06F 3/041* (2013.01); *G06F 3/0418* (2013.01); *G06F 2203/04107* (2013.01)

(58) Field of Classification Search
CPC .................. H01L 2924/00; H01L 2924/15788; H01L 2924/12042; H01L 2924/1306; H01L 2924/0002; H01L 2924/01074; H01L 2924/0132; H01L 2924/01022; H01L 27/124; H01L 2924/3025; H01L 2224/16; H01L 27/1248; H01L 2924/00014; H01L 2924/12044;H01L 2924/1461; G06F 3/044; G06F 2203/04103; G06F 3/0412; G06F 3/045; G06F 3/03547; G06F 2203/04106; G06F 2203/04107; G06F 3/0416; G06F 2203/04111; G06F 3/0418; G06F 2203/04112; G06F 3/041; G06F 3/047; G06F 2203/04101; G06F 3/017; G06F 2203/04104; H05K 3/361; H05K 3/323
See application file for complete search history.

(56) References Cited

U.S. PATENT DOCUMENTS

| 9,207,788 B2* | 12/2015 | Lin ......................... G06F 3/041 |
| 2009/0314621 A1* | 12/2009 | Hotelling .............. G06F 3/0416 200/600 |
| 2011/0109583 A1* | 5/2011 | Lee ......................... G06F 3/044 345/174 |
| 2014/0300832 A1* | 10/2014 | de Jong .................. G06F 3/041 349/12 |

(Continued)

FOREIGN PATENT DOCUMENTS

CN 102867614 A * 7/2001 ............. H01F 17/00

*Primary Examiner* — Alesa Allgood
(74) *Attorney, Agent, or Firm* — Cooper Legal Group, LLC

(57) ABSTRACT

A touch panel and a method thereof are provided. The touch panel includes a touch sensor, a shielding layer, and a plurality of conducting foils. The shielding layer is disposed on the touch sensor. The plurality of conducting foils is disposed via an Anisotropic Conductive Film (ACF) on a surface of the shielding layer, which is on an opposite side of a surface of the touch sensor. Any two of the plurality of conducting foils, the ACF, and the shielding layer are connected in series as a signal path.

16 Claims, 3 Drawing Sheets

(56) References Cited

U.S. PATENT DOCUMENTS

| 2014/0340590 | A1* | 11/2014 | Shih | G06F 3/041 |
| | | | | 349/12 |
| 2015/0109543 | A1* | 4/2015 | Lee | G06F 3/044 |
| | | | | 349/12 |

* cited by examiner

TOUCH PANEL AND TEST METHOD THEREOF

BACKGROUND OF THE INVENTION

This Application claims priority of China Patent Application No. CN 201310313434.2, filed on Jul. 24, 2013, and the entirety of which is incorporated by reference herein.

Field of the Invention

The present disclosure relates to a touch panel technology, and in particular, a touch panel and a test method thereof.

Description of the Related Art

Widely adopted electronic systems such as a Personal Digital Assistant, handheld game console, smart phone, and tablet PC may include a touch panel and a monitor. Because the touch panel may be disposed above the monitor, a touch sense layer in the touch panel could easily be coupled together by the electromagnetic interference from the monitor and consequently, sense precision thereof would be reduced.

In order to enhance interference resistivity for the touch panel, a shielding layer is typically disposed at the touch sense layer on the side of the touch panel, close to the monitor, thereby preventing the touch sense layer from being affected by the electromagnetic interference from the monitor. The shielding layer is connected to a ground of the system via a Flexible Printed Circuit (FPC), to form a leaking path for the shielding layer. The electrical characteristics of the leaking path will impact the shielding performance of the shielding layer. Thus, the leaking path of the shielding layer is tested when tests are conducted on the touch panel.

The current approach for testing the leaking path of the shielding layer involves providing a signal with a fixed frequency by a testing device to the shielding layer, to measure capacitance of the coupling capacitor between the shielding layer and the touch sense layer. If the measured capacitance is different from the default value, it will be determined that the leaking path of the shielding layer has poor electrical characteristics, which may have been, for example, caused by a poor connection between the FPC and the shielding layer.

An alternative current (AC) characteristic of the shielding layer is used for testing of the coupling capacitor. Therefore, when the resistance of the shielding layer is abnormally high and exceeds a defined working range, the test may not efficiently and correctly identify problems which may be occurring. Subsequently, the shielding layer may not perform normally. As a result, the interference resistivity of the shielding layer will be reduced.

BRIEF SUMMARY OF THE DISCLOSURE

A detailed description is given in the following embodiments with reference to the accompanying drawings.

An embodiment of a touch panel is disclosed, comprising a touch sensor, a shielding layer and a plurality of conducting foils. The shielding layer is isolated and disposed on the touch sensor. Each of the plurality of conducting foils is separately disposed on a surface of the touch sensor from one another through an Anisotropic Conductive Film (ACF), wherein the surface is away from the shielding layer. Any two of the conducting foils, the ACF, and the shielding layer are connected serially to form a signal path.

In one embodiment, any two adjacent conducting foils are separated by a separation distance ranging from 10 to 15 μm.

In another embodiment, the conducting foils have substantially a same area and dimension.

In another embodiment, the shielding layer is formed by a transparent conducting material, a composite of a transparent conducting material and a metal or a non-metal.

In another embodiment, the conducting foils are formed by a metal or a metal composite.

In another embodiment, the shielding layer has a mesh structure.

In another embodiment, the touch sensor comprises a substrate and a sense electrode layer. The sense electrode layer is formed on a surface of the substrate, and is adjacent to the shielding layer In another embodiment, the panel further comprises an isolation layer, disposed between the sense electrode layer and the shielding layer.

In another embodiment, the isolation layer is a Colloid.

An embodiment of a method of testing a touch panel is provided, comprising: providing the touch panel which includes a touch sensor, a shielding layer and a plurality of conducting foils, wherein the shielding layer is isolated and disposed on the touch sensor, and each of the plurality of conducting foils is separately disposed on a surface of the touch sensor from one another through an ACF, wherein the surface of the touch sensor is away from the shielding layer; delivering a testing signal through a signal path serially connected by any two of the conducting foils, the ACF and the shielding layer; and calculating an electric characteristic generated by the testing signal through the signal path.

In one embodiment, the electric characteristic is a loop resistance.

In another embodiment, the loop resistance is in direct proportion to a sheet resistance of one of the conducting foils, the ACF, and the shielding layer.

In one embodiment, the loop resistance is in direct proportion to an interface resistance between one of the conducting foil and the electrically coupled ACF, or between the ACF and the shielding layer.

In another embodiment, any two adjacent conducting foils are separated by a separation distance ranging from 10 to 15 μm.

In one embodiment, the conducting foils have substantially a same area and dimension.

In another embodiment, the shielding layer is formed by a transparent conducting material, a composite of a transparent conducting material and a metal or a non-metal.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1A:
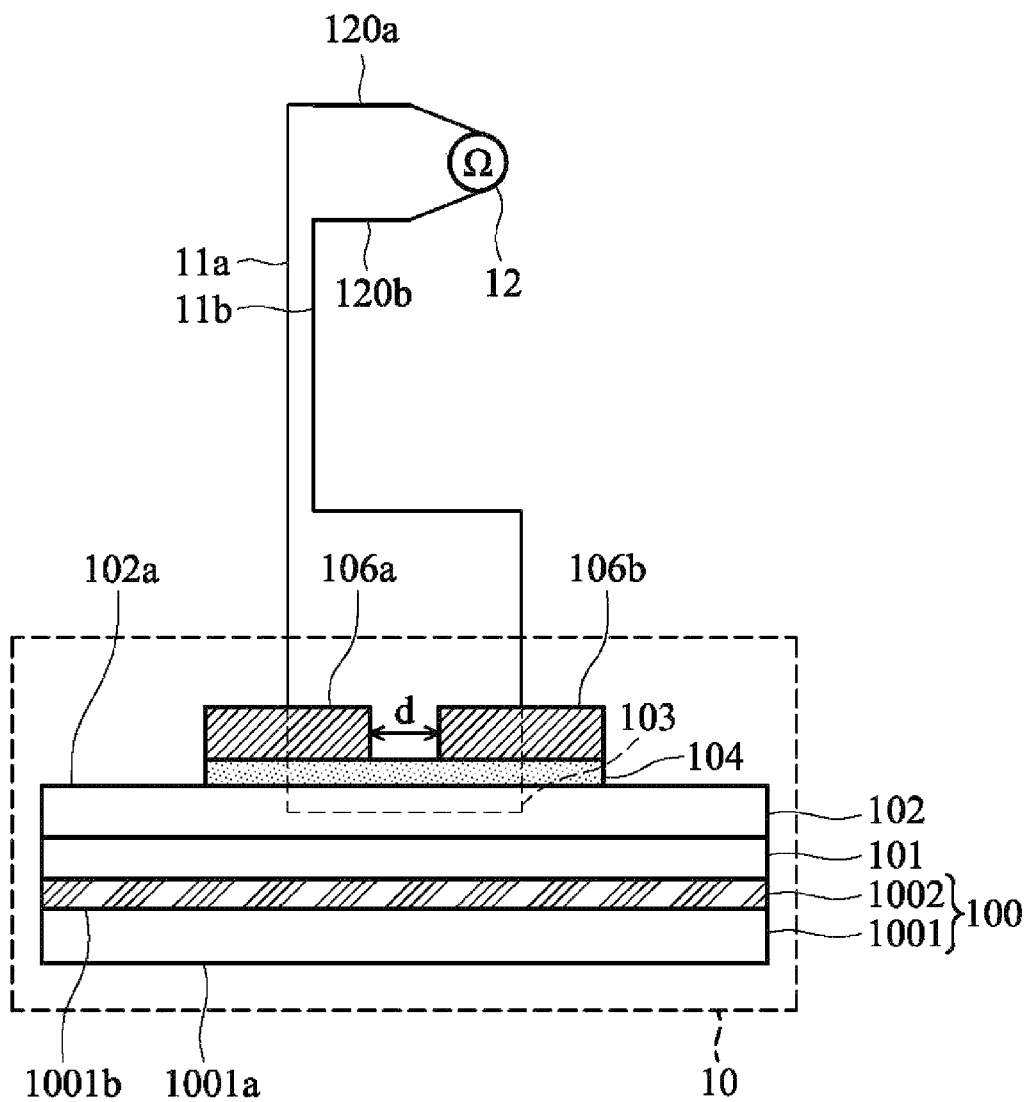
FIG. 1A illustrates a cross-section diagram of a touch panel in a testing condition according to an embodiment of the invention.

FIG. 1A illustrates a cross-section diagram of a touch panel in a testing condition according to an embodiment of the invention. The touch panel 10 may be applied to a smart phone, a tablet computer, a laptop computer and other system devices, serving as a user operation interface of the system device. In the embodiment, the touch panel 10 includes a touch sensor 100, a shielding layer 102 and a plurality of conducting metal foils 106a and 106b. The two conducting metal foils 106a and 106b are embodied to illustrate the operation of the invention. Further, the shielding layer 102 is disposed on the touch sensor 100 to shield the touch sensor 100 from interference due to the external signals. For example, when the touch panel 10 is applied to a system device, the shielding layer 102 is configured to shield the electromagnetic signal interference from the monitor or the main board of the system device. The two conducting metal foils 106a and 106b are separately disposed on the surface of the shielding layer 102 that is away from the touch sensor 100 via an Anisotropic Conductive Film 104 (hereinafter referred to as ACF 104). As a consequence, the conducting metal foils 106a and 106b, the ACF 104 and the shielding layer 102 are serially connected to form a signal path 103 which serves as a testing means for the shielding effect of the shielding layer 102 of the touch panel 10.

More specifically, the touch panel 100 further contains a substrate 1001 and a sense electrode layer 1002. The substrate 1001 correspondingly includes two surfaces 1001a and 1001b, wherein the surface 1001a is close to the side of the user's viewing direction. The sense electrode layer 1002 is formed on the surface 1001b of the substrate 1001. Moreover, since both the sense electrode layer 1002 and the shielding layer 102 belong to a conducting material layer, the touch panel 10 further contains an isolation layer 101 between the sense electrode layer 1002 and the shielding layer 102, to provide an electrical isolation between the sense electrode layer 1002 and the shielding layer 102. Regarding the manufacturing process, the isolation layer 101 and the shielding layer 102 may be formed by directly and sequentially performing a photo-lithography process on the sense electrode layer 1002. In other embodiments, the isolation layer 101 may be a gluing material which sticks the shielding layer 102 and the sense electrode layer 1002 together.

The two conducting metal foils 106a and 106b may be designed, for example, to have substantially the same area and dimensions, with an optimal separation distance d ranging from between 10 μm to 15 μm therebetween. The dimensions and the separation distance d of the two conducting metal foils 106a and 106b are not limited by the examples in the embodiment, and may be adaptable based on design requirements.

Accordingly, when the touch panel 10 is configured to perform a test on the shielding performance, a detection device 12 (such as an ohm meter) is configured to electrically connect to the conducting foils 106a and 106b of the touch panel 10 via the connection wires 11a and 11b, and the detection device 12 may deliver a testing signal (such as a voltage) to the conducting foil 106a through the connection wire 11a, which is then passed to the conducting foil 106b through the signal path 103. Thus, the testing signal returns to the detection device 12 through the connection wire 11b. Therefore, the detection device 12 can compute an electrical characteristics (such as an ohm reading) for the testing signal which travels through the signal path 103, and determine the direct current (DC) characteristic for the signal path 103. Consequently, a determination device (not shown) on the detection device 12 can determine the shielding performance of the shielding layer 102 based on the computed electrical characteristics. Thus, a poor electrical characteristics indicates poor shielding performance of the shielding layer 102.

In addition, the connection wires 11a, 11b may be conducting wires in a soft printed circuit board on the touch panel 10. When the touch panel 10 is under a test, the conducting foils 106a and 106b are electrically connected to the detection device 12 through the connection wires 11a and 11b, respectively, thereby forming a closed loop by the detection device 12, the connection wires 11a, 11b, and the signal path 103. In other words, the detection device 12 can determine the electrical characteristics (such as a loop resistance) for a loop of the connection wires 11a, the signal path 103 and the connection wire 11b all at once. When the touch panel 10 is applied to the system device, the pins connecting to the connection wires 11a and 11b are assigned to the ground. Thus, the shielding layer 102 can provide the shielding function through a leaking path formed by the signal path 103, the connection wires 11a and 11b and the ground.

Take an ohm meter as the detection device 12 as an example, if the loop resistance between the two pins 120a and 120b of the detection device 12 is $R_{AB}$, expressed by Equation (1):

$$R_{AB}=R_{A(11a)}+R_{A(11a \to 106a)}+R_{(106a)}+R_{A(106a \to 104)}+R_{(104)}+R_{(104 \to 102)}+R_{GAP(102)}+R_{B(11b)}+R_{B(11b \to 106b)}+R_{(106b)}+R_{B(106b \to 104)}+R_{(104)}+R_{(104 \to 102)}$$

Equation (1)

where $R_{A(11a)}$ is wire resistance of the connection wire 11a,
$R_{B(11b)}$ is wire resistance of the connection wire 11b,
$R_{A(11a \to 106a)}$ is interface resistance between the connection wire 11a and the electrically coupled conducting foil 106a,
$R_{B(11b \to 106a)}$ is interface resistance between the connection wire 11b and the electrically coupled conducting foil 106b,
$R_{(106a)}$ is sheet resistance of the conducting foil 106a,
$R_{(106b)}$ is sheet resistance of the conducting foil 106b,
$R_{A(106a \to 104)}$ is interface resistance between the conducting foil 106a and the electrically coupled ACF 104,
$R_{A(106b \to 104)}$ is interface resistance between the conducting foil 106b and the electrically coupled ACF 104,
$R_{(104)}$ is sheet resistance of the ACF 104,
$R_{(104 \to 102)}$ is interface resistance between the ACF 104 and the electrically coupled shielding layer 102, and
$R_{GAP(102)}$ is sheet resistance of the shielding layer 102 between the two conducting foils 106a and 106b.

From the above Equation (1), it can be seen that the loop resistance ($R_{AB}$) and any one of the wire resistances ($R_{A(11a)}$ '$R_{B(11b)}$), sheet resistances ($R_{(106a)}$ ' $R_{(106b)}$ '$R_{(104)}$' $R_{GAP(102)}$) and interface resistances ($R_{A(11a \to 106a)}$ ' $R_{A(106a \to 104)}$' $R_{(104 \to 102)}$ '$R_{B(11b \to 106b)}$' $R_{B(106b \to 104)}$) are in direct proportion. In other words, the loop resistance can reflect any abnormality due to manufacturing defects in the sheet resistances of each layer or the interface resistance between adjacent layers of the shielding layer 102, the AFC 104, the conducting foils 106a, 106b of the touch panel 10. Additionally, since the wires are relatively more stably connected (such as the conducting wires of the soft printed circuit board), their resistances are more constant and the values thereof are smaller, when the resistances of the wires are ignored, the loop resistance detected by the detection device 12 represents the electrical characteristics of the signal path 103.

As explained, the loop resistance detected by the detection device 12 may be further automatically determined by the determination device (not shown). In one embodiment, the determination device may, for example, set a default resistance. When the loop resistance is less than or equal to the default resistance, the determination device may determine that the shielding performance of the shielding layer 102 of the touch panel 10 meets requirements, shielding interference signals and allowing the touch panel 10 to be protected against interference. Otherwise, when the loop resistance exceeds the default resistance, the shielding performance of the shielding layer 102 may be determined as not meeting requirements. The cause for losing interference shielding capability may be due to the failure of electrical coupling between the shielding layer 102, the ACF 104 and the conducting foils 106a, 106b, or may be due to conducting impurities present in each layer, resulting in an increased loop resistance. Further, when the loop resistance grows to a considerably large value, the determination device can determine that the shielding layer 102 of the touch panel 10 has lost its interference shielding capability, caused by disconnections and no electrical coupling between layers, which are due to poor device production.

Figure 1B:
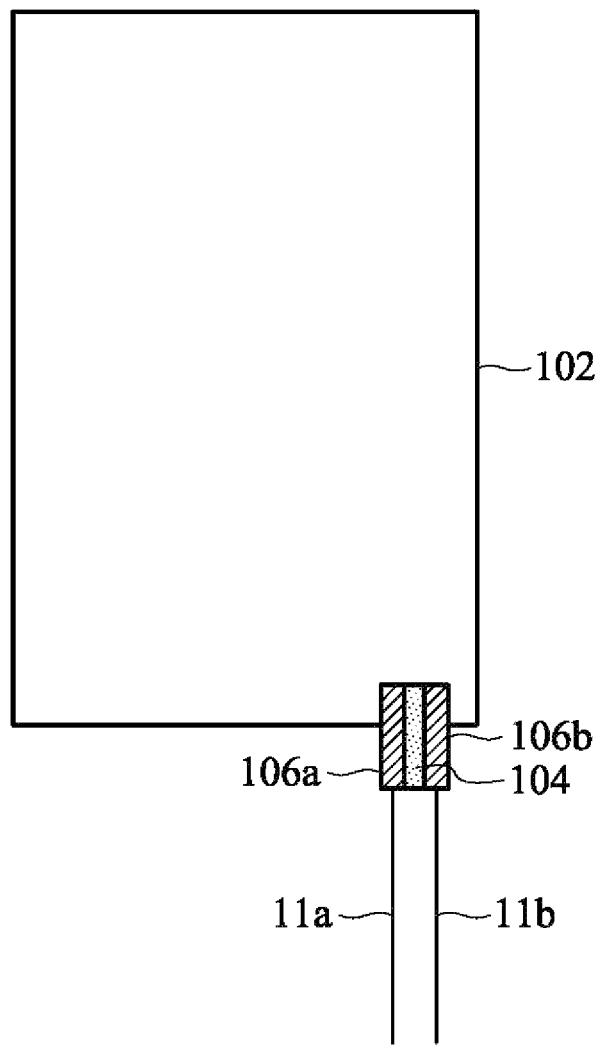
FIG. 1B illustrate a top of the touch panel in FIG. 1A.
Figure 2:
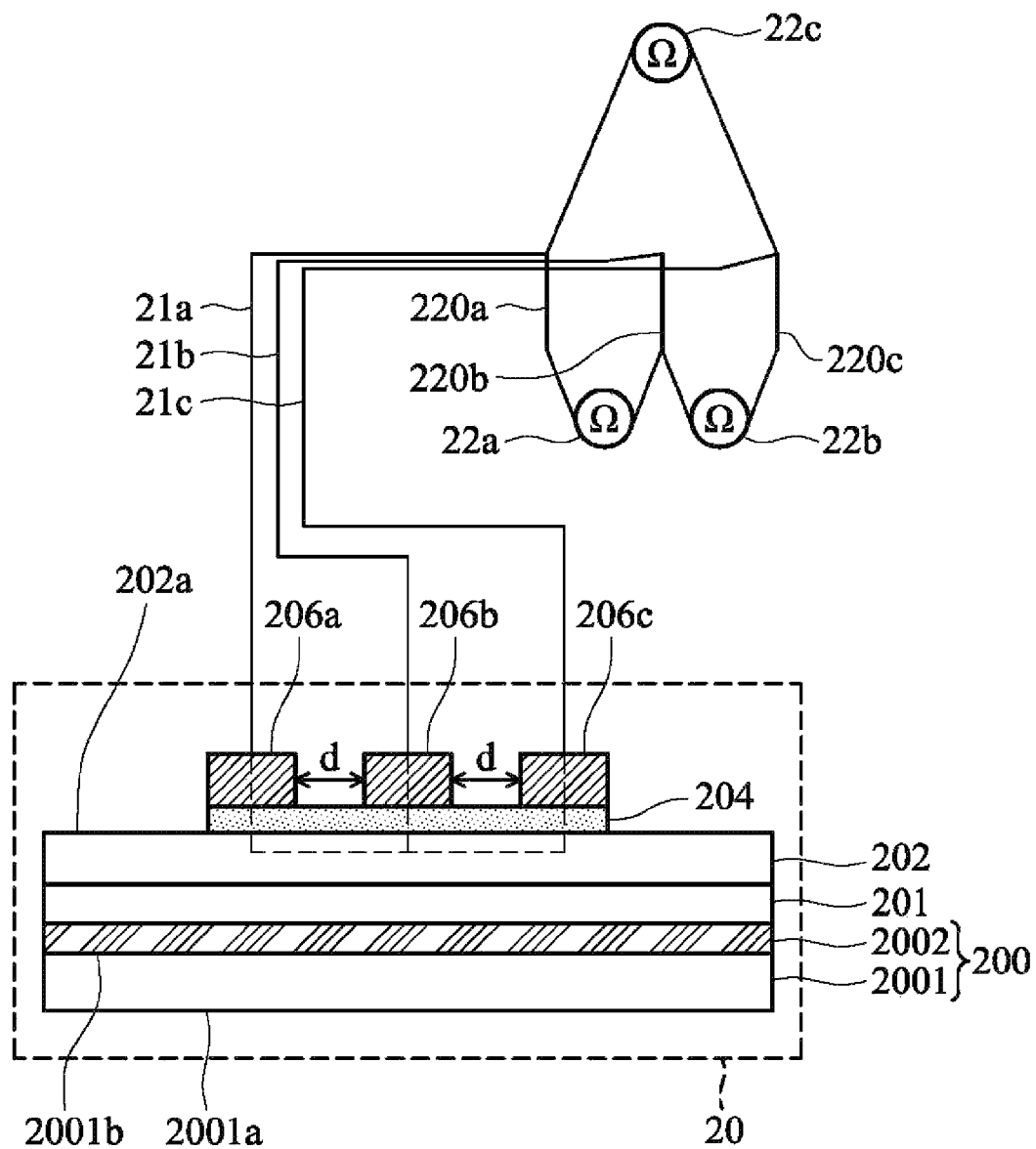
FIG. 2 illustrates a cross-section diagram of another touch panel in a testing condition according to an embodiment of the invention.

FIG. 2 illustrates a cross-section diagram of another touch panel in a testing condition according to an embodiment of the invention. The structure of the touch panel 20 in the present embodiment is distinct from that in the FIG. 1 in that the touch panel 20 is designed with three conducting foils 206a, 206b and 206c. The three conducting foils 206a, 206b and 206c are designed to have the same area and dimensions, with any two adjacent conducting foils being set apart from each other by the separation distance d of 10 μm to 15 μm. It should be noted that the dimensions and separation distance d of the conducting foils 206a, 206b, and 206c are not limited to the embodiment, rather, they may be adjusted according to actual design requirements. In the embodiment, the shielding layer 202 is disposed on the touch sensor 200 through the isolation layer 201, shielding the touch sensor 200 from external signals and interference. The conducting foils 206a, 206b, and 206c are separately disposed on a surface 202a of the shielding layer 202, away from the touch sensor 200. For sake of explanation, the embodiment employs three detection devices 22a, 22b and 22c to respectively perform tests for the signal paths formed between any two of the three conducting foils 206a, 206b, and 206c, through the ACF 204 and the shielding layer 202. Therefore, the conducting foils 206a, 206b, the ACF 204 and the shielding layer 202 are serially connected to form a signal path that is tested by the detection device 22a, and the conducting foils 206b, 206c, the ACF 204 and the shielding layer 202 are serially connected to form a signal path that is tested by the detection device 22b. Also, the conducting foils 206a, 206c, the ACF 204 and the shielding layer 202 are serially connected to form a signal path that is tested by the detection device 22c. Any of the signal paths can serve to provide testing for the shielding performance of the shielding layer 202 of the touch panel 20. In practice, the embodiment can adopt only one detection device to test for different signal paths, but the number of detection devices is not limited to the embodiment.

Under the infrastructure of the embodiment, the determination device can be designed to have a dedicated determination rule for each of the three loop resistances obtained by the detection devices 22a, 22b and 22c. In one embodiment, only when the three loop resistances are all less than or equal to the default resistance, will the determination device determine whether the shielding performance of the shielding layer 202 of the touch panel 20 meets requirements. In other words, when any one of the loop resistances exceeds the default resistance, the determination device can determine that the interference and signal shielding function of the shielding layer 202 of the touch panel 20 may malfunction. Moreover, when any one of the loop resistances is determined as being infinite, the determination device can determine that the interference and signal shielding function of the shielding layer 202 of the touch panel 20 has been lost completely.

In another embodiment, the determination device may be designed to determine that, when none of the three loop resistances is determined as being infinite, and two of the loop resistances are less than or equal to the default resistance, the shielding performance of the shielding layer 202 of the touch panel 20 meets requirements. Otherwise, the shielding performance of the shielding layer 202 of the touch panel would be determined as not meeting requirements.

Additionally, in the previous embodiments, the shielding layer 102(202) may be made by a transparent conducting material which may be selected from indium tin oxide (ITO), indium zinc oxide (IZO), cadmium tin oxide (CTO), aluminum zinc oxide (AZO), indium tin zinc oxide (ITZO), tin oxide, zinc oxide, cadmium oxide, hafnium oxide (HfO), indium gallium aluminum oxide (InGaAlO), Carbon Nano Tube (CNT), Nano Silver, other transparent conducting materials or metallic composites which may be copper, silver, MoAlMo, or other metallic composite group.

In conclusion, the embodiments of the invention can be adopted to test for the shielding function of the touch panel through the improved design in the infrastructure of the touch panel. The detection device and the shielding layer forms a closed loop to directly test for the DC characteristic of the shielding layer, effectively identifying the touch panels with poor shielding performance. Thus, touch panel products may have stable interference resistivity. Further, since the shielding layer can still form a coupling capacitor with the sense electrode in the infrastructure of the touch panel in the embodiments, the detection device can provide a fixed-frequency signal to the shielding layer through any of the conducting foils, to test for the alternative current (AC) characteristics of the shielding layer.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A touch panel, comprising:
a touch sensor;
a shielding layer isolated from the touch sensor; and
a testing means comprising a plurality of conducting foils disposed on the shielding layer via an Anisotropic Conductive Film (ACF), wherein each of the plurality of conducting foils are separately disposed, and
wherein the ACF, the shielding layer, and any two of the plurality of conducting foils are connected serially to form a signal path of the testing means.

2. The touch panel of claim 1, wherein any two adjacent conducting foils of the plurality of conducting foils are separated by a separation distance ranging from 10 to 15 µm.

3. The touch panel of claim 1, wherein the plurality of conducting foils have substantially a same area and dimension.

4. The touch panel of claim 1, wherein the shielding layer is formed by a transparent conducting material, a composite of a transparent conducting material and a metal or a non-metal.

5. The touch panel of claim 1, wherein the plurality of conducting foils are formed by a metal or a metal composite.

6. The touch panel of claim 1, wherein the shielding layer has a mesh structure.

7. The touch panel of claim 1, wherein the touch sensor comprises:
 a substrate; and
 a sense electrode layer formed on the substrate.

8. The touch panel of claim 7, further comprising an isolation layer disposed between the sense electrode layer and the shielding layer.

9. The touch panel of claim 8, wherein the isolation layer is a colloid or a gluing material.

10. A method of testing a touch panel, comprising: providing the touch panel which comprises a touch sensor, a shielding layer isolated from the touch sensor, and a testing means comprising a plurality of conducting foils disposed on the shielding layer via an Anisotropic Conductive Film (AFC), wherein each of the plurality of conducting foils is separately disposed, and wherein the AFC, the shielding layer, and any two of the plurality of conducting foils are connected serially to form a signal path of the testing means; delivering a testing signal through the signal path; and calculating an electric characteristic generated by the testing signal through the signal path.

11. The method of claim 10, wherein any two adjacent conducting foils of the plurality of conducting foils are separated by a separation distance ranging from 10 to 15 µm.

12. The method of claim 10, wherein each of the plurality of conducting foils has substantially a same area and dimension.

13. The method of claim 10, wherein the shielding layer is formed by a transparent conducting material, a composite of a transparent conducting material and a metal or a non-metal.

14. The method of claim 10, wherein the electric characteristic is a loop resistance.

15. The method of claim 14, wherein the loop resistance is in direct proportion to a sheet resistance of one of the plurality of conducting foils, the ACF, and the shielding layer.

16. The method of claim 14, wherein the loop resistance is in direct proportion to an interface resistance between one of the plurality of conducting foils and the ACF, or between the ACF and the shielding layer.

* * * * *